United States Patent
Hanano

(10) Patent No.: US 11,113,016 B2
(45) Date of Patent: Sep. 7, 2021

(54) INFORMATION PROCESSING METHOD, INFORMATION PROCESSING APPARATUS, AND NON-TRANSITORY COMPUTER-READABLE STORAGE MEDIUM

(71) Applicant: CANON KABUSHIKI KAISHA, Tokyo (JP)

(72) Inventor: Hideki Hanano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/824,875

(22) Filed: Mar. 20, 2020

(65) Prior Publication Data

US 2020/0310704 A1   Oct. 1, 2020

(30) Foreign Application Priority Data

Mar. 29, 2019   (JP) .............................. JP2019-068068

(51) Int. Cl.
  *G06F 3/12*   (2006.01)
(52) U.S. Cl.
  CPC ............ *G06F 3/126* (2013.01); *G06F 3/1205* (2013.01)
(58) Field of Classification Search
  CPC ...... G06F 3/126; G06F 3/1205; G06F 3/1257; G06F 3/1204; G06F 3/1225; G06F 3/1285; H04N 1/00204; H04N 1/00236; H04N 2201/0008; H04N 1/00822; H04N 1/00517
See application file for complete search history.

(56) References Cited

U.S. PATENT DOCUMENTS

| | | | |
|---|---|---|---|
| 10,445,034 B2* | 10/2019 | Omura | G06F 3/1253 |
| 2003/0131072 A1* | 7/2003 | Kobayashi | G06F 3/1286 709/218 |
| 2005/0128501 A1* | 6/2005 | Choi | G06F 3/1285 358/1.13 |
| 2009/0244620 A1* | 10/2009 | Takahashi | G06F 3/1285 358/1.15 |
| 2011/0063658 A1* | 3/2011 | Natori | G06F 3/1204 358/1.15 |

FOREIGN PATENT DOCUMENTS

JP   2002175258 A   6/2002

* cited by examiner

*Primary Examiner* — Neil R McLean
(74) *Attorney, Agent, or Firm* — Venable LLP

(57) ABSTRACT

There is provided with an information processing method of an information processing apparatus communicable with a plurality of devices. The method comprises selecting any one of the plurality of devices as a device to be used to perform a predetermined process; installing, based on that the device to be used to perform a predetermined process is changed from a first device among the plurality of devices to a second device among the plurality of devices by the selecting, a second device driver corresponding to the second device to the information processing apparatus; and setting, to the second device driver installed by the installing, at least a part of setting data for performing the predetermined process set to a first device driver corresponding to the first device.

13 Claims, 13 Drawing Sheets

FIG. 8
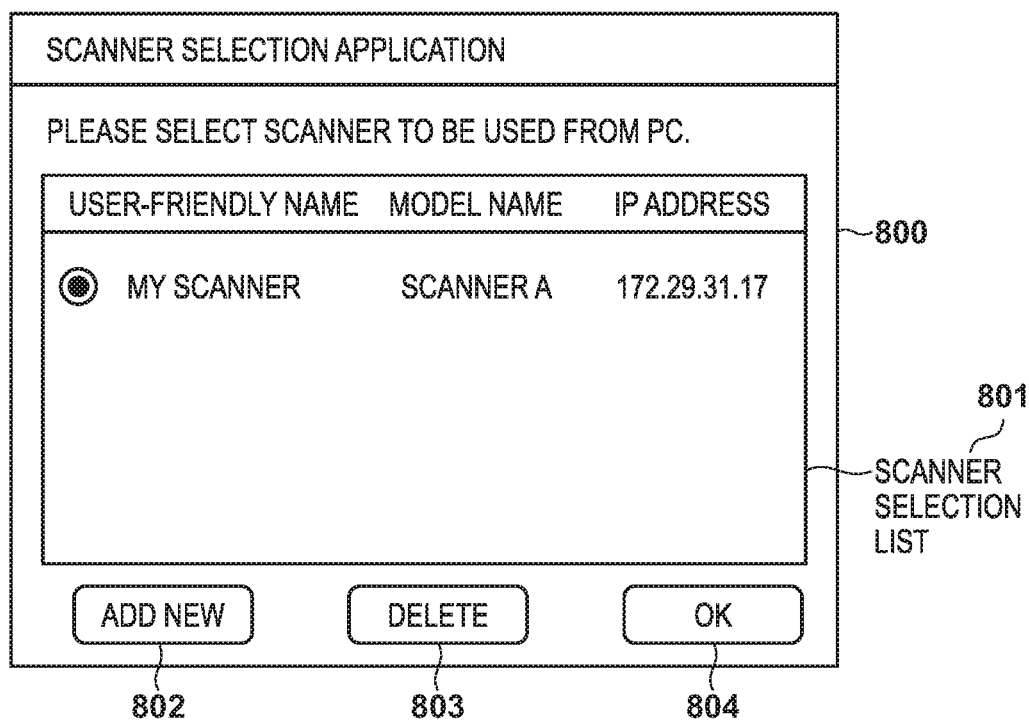
FIG. 9
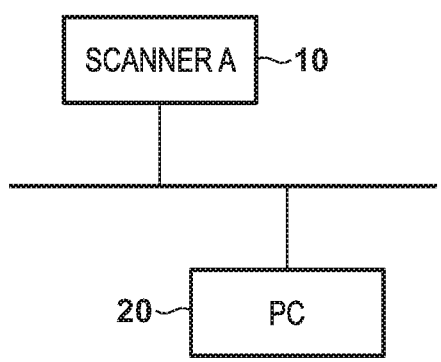 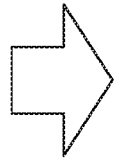 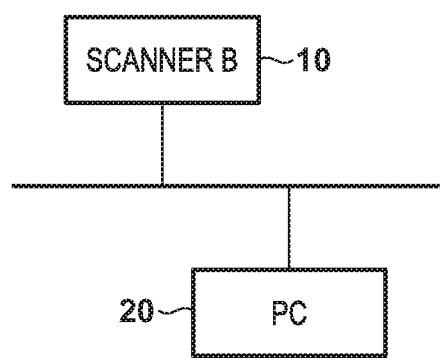

F I G. 15
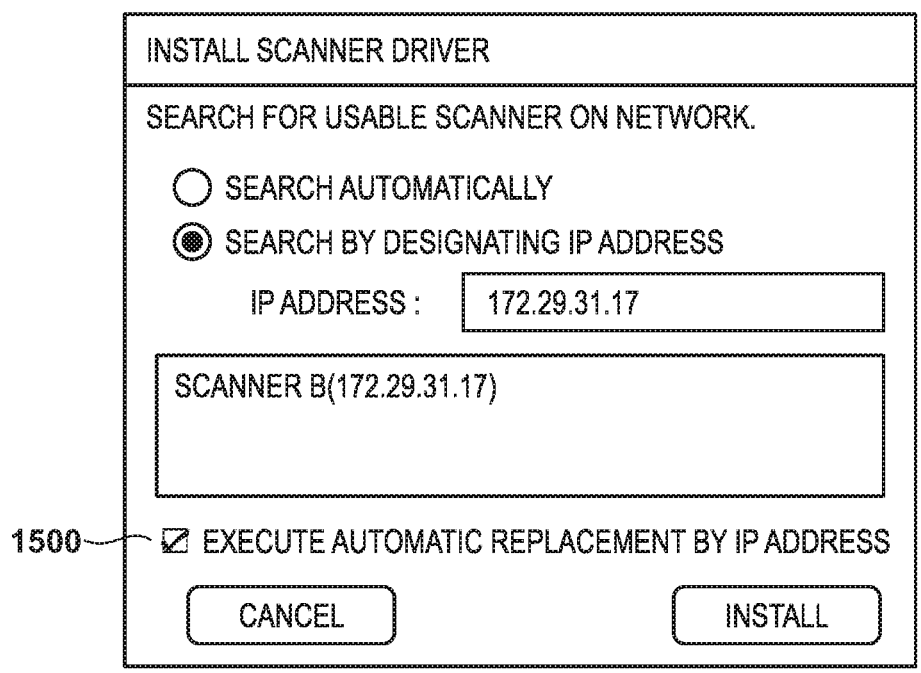

INFORMATION PROCESSING METHOD, INFORMATION PROCESSING APPARATUS, AND NON-TRANSITORY COMPUTER-READABLE STORAGE MEDIUM

BACKGROUND OF THE INVENTION

Field of the Invention

The present invention relates to an information processing method, an information processing apparatus, and a non-transitory computer-readable storage medium.

Description of the Related Art

As a technique of connecting an information processing apparatus to a device on a network, Japanese Patent Laid-Open No. 2002-175258 discloses a printer system in which a host computer is connected to a printer. In this printer system, a printer driver composed of modules is provided, and the module to be operated is switched in accordance with the connected printer. This eliminates the need to newly install a printer driver when another printer is connected to the host computer, thereby improving user convenience.

SUMMARY OF THE INVENTION

According to one embodiment of the present invention, an information processing method of an information processing apparatus communicable with a plurality of devices, the method comprises: selecting any one of the plurality of devices as a device to be used to perform a predetermined process; installing, based on that the device to be used to perform a predetermined process is changed from a first device among the plurality of devices to a second device among the plurality of devices by the selecting, a second device driver corresponding to the second device to the information processing apparatus; and setting, to the second device driver installed by the installing, at least a part of setting data for performing the predetermined process set to a first device driver corresponding to the first device.

According to another embodiment of the present invention, an information processing apparatus communicable with a plurality of devices, comprises: a selecting unit configured to be capable of selecting any one of the plurality of devices as a device to be used to perform a predetermined process; an installing unit configured to install, based on that the device to be used to perform a predetermined process is changed from a first device among the plurality of devices to a second device among the plurality of devices, a second device driver corresponding to the second device to the information processing apparatus; and a data control unit configured to set, to the second device driver installed by the installing unit, at least a part of setting data for performing the predetermined process set with respect to a first device driver corresponding to the first device.

According to still another embodiment of the present invention, a non-transitory computer-readable storage medium storing a program for causing a computer of an information processing apparatus communicable with a plurality of devices to operate to: select any one of the plurality of devices as a device to be used to perform a predetermined process; install, based on that the device to be used to perform a predetermined process is changed from a first device among the plurality of devices to a second device among the plurality of devices by the selecting, a second device driver corresponding to the second device to the information processing apparatus; and set, to the second device driver installed by the installing, at least a part of setting data for performing the predetermined process set to a first device driver corresponding to the first device.

Further features of the present invention will become apparent from the following description of exemplary embodiments (with reference to the attached drawings).

BRIEF DESCRIPTION OF THE DRAWINGS

FIG. 8 is a view showing a scanner selection screen of the scanner selection application;

FIG. 9 is a view showing a connection form between the PC and the scanner;

FIG. 15 is a view showing a scanner driver installation screen.

DESCRIPTION OF THE EMBODIMENTS

Figure 1:
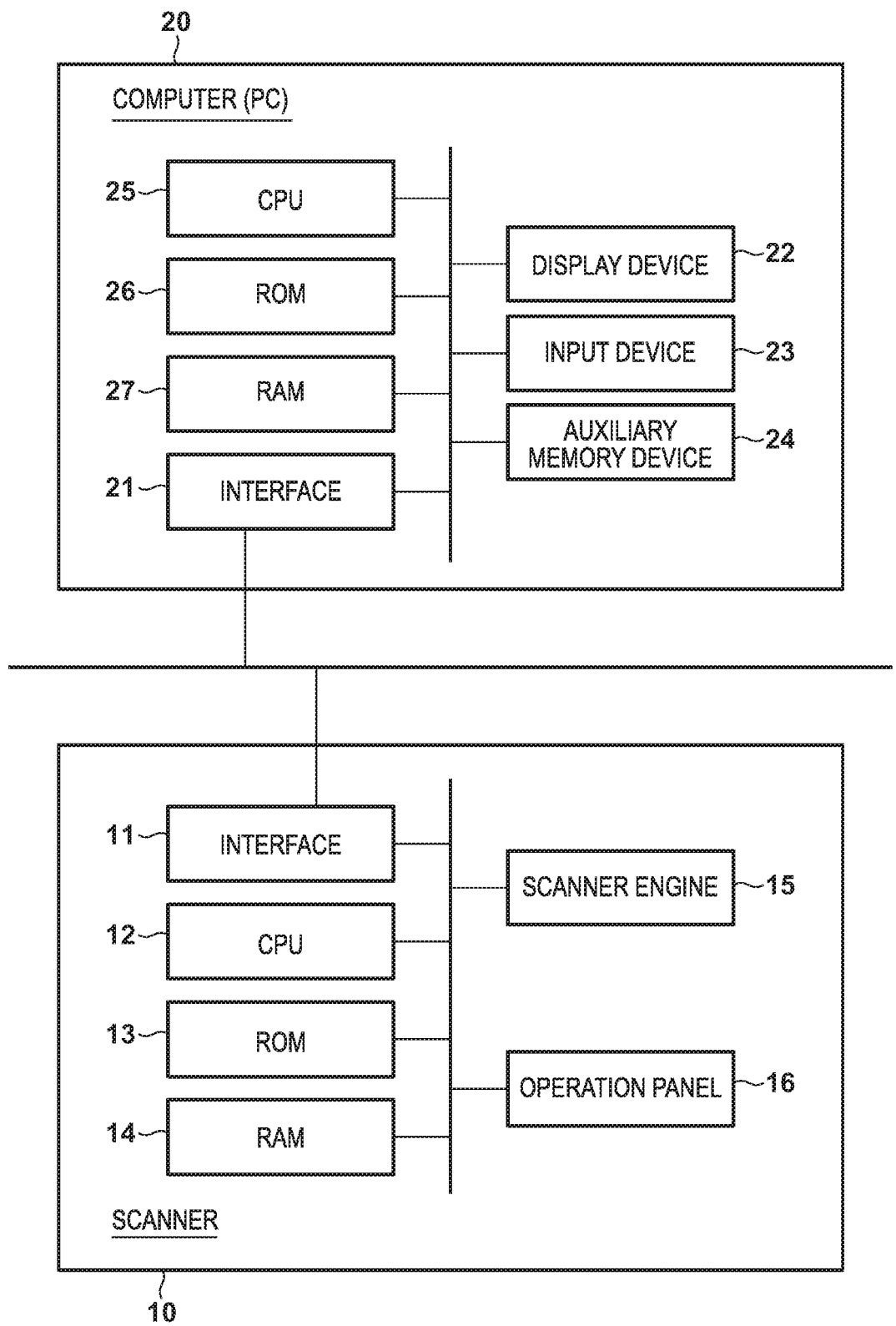
FIG. 1 is a block diagram schematically showing the arrangement of an information processing apparatus according to the first embodiment.

In the conventional technique described above, for example, the setting information such as the sheet size and color/monochrome setting at the time of printing before the module change is not taken over to the printer driver after the change, so that the setting or the like at the time of printing needs to be manually performed again. That is, there is a problem that when the device to be used is changed, a user is required to manually perform the setting again, and this may be a cumbersome operation for a user.

Each of embodiments of the present invention provides a technique for further improving user convenience.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

In the first embodiment, a system formed by a computer as an information processing apparatus and a scanner as a device will be described as an example. FIG. 1 is a block diagram showing an example of the arrangement of the information processing apparatus according to the first embodiment. A computer 20 (to be referred to as a PC 20 hereinafter) as the information processing apparatus is communicable with a scanner 10 via a network, and the computer 20 and the scanner 10 form the system. The network is, for example, a wired LAN, a wireless LAN, the Internet, or the like.

<Arrangement of Each Component>

The PC 20 functions as an information processing apparatus that transmits various kinds of control commands interpretable by the scanner 10 and receives image data read according the control commands by the scanner 10. The PC 20 includes, as its hardware components, an interface 21, a display device 22, an input device 23, an auxiliary memory device 24 (storage unit), a CPU 25, a ROM 26 (storage unit), and a RAM 27.

The interface 21 controls exchange of data with a peripheral such as the scanner 10. The display device 22 is implemented by, for example, a display or the like and displays various kinds of user interface (to be referred to as UI hereinafter) screens. The input device 23 is implemented by, for example, a keyboard, a pointing device, and the like and inputs instructions from the user in the apparatus. The auxiliary memory device 24 is implemented by an integrated or external hard disk or the like and capable of storing various kinds of information. The ROM 26 stores various kinds of programs, and the RAM 27 temporarily stores data and programs. The CPU 25 supervises and controls the PC 20 in accordance with a program read out from the ROM 26 or the auxiliary memory device 24 while using the RAM 27 as a work area.

The scanner 10 functions as an image reading apparatus that generates image data by reading an original based on control from the PC 20 and transmits the generated image data to the PC 20. The scanner 10 is, for example, a CCD color image scanner. The CCD color image scanner optically reads an original placed on an original table by scanning a CCD line sensor (not shown) and converts the read original into image data. The scanner 10 includes, as its hardware components, an interface 11, a CPU 12, a ROM 13, a RAM 14, a scanner engine 15, and an operation panel 16.

The interface 11 controls the exchange of data with another apparatus such as the PC 20. The ROM 13 stores various kinds of programs, and the RAM 14 temporarily stores data and programs. The CPU 12 supervises and controls the scanner 10 in accordance with a program read out from the ROM 13 while using the RAM 14 as a work area. The scanner engine 15 controls an original reading unit equipped with a CCD color image sensor or the like. The operation panel 16 is formed from a display unit for displaying the status of the image reading apparatus or a menu and an input unit for inputting instructions from the user to the apparatus.

Figure 2:
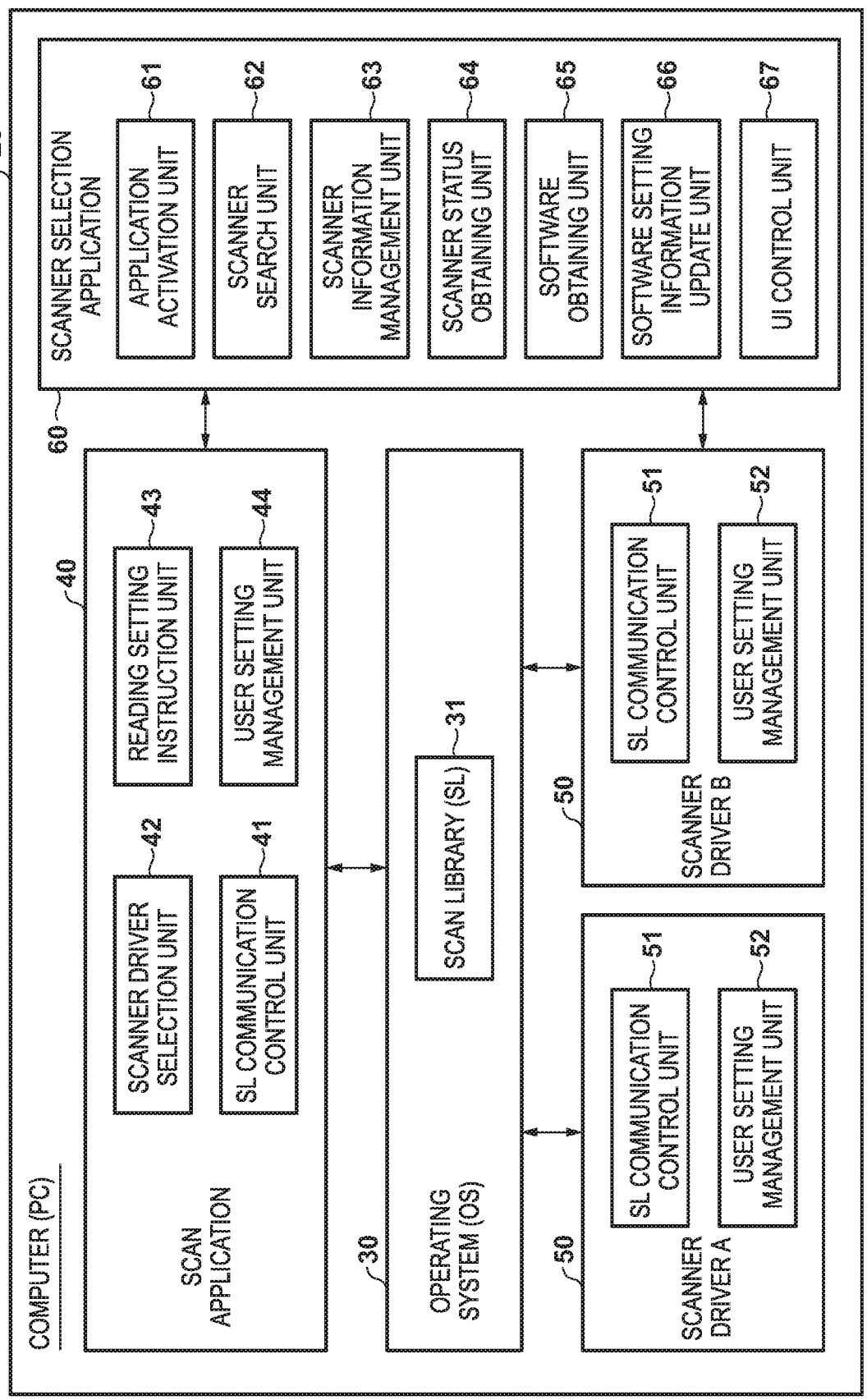
FIG. 2 is a functional block diagram of a PC as an example of the information processing apparatus.

FIG. 2 describes an example of the functional arrangement in the PC 20. Note that each functional unit is implemented by, for example, the CPU 25 reading out and executing a program stored (that is, installed) in the ROM 26 or the auxiliary memory device 24 while using the RAM 27 as a work area. The functional arrangement to be implemented in the PC 20 can be broadly divided into an operating system (OS) 30, a scan application 40 conforming to a predetermined image communication specification, a scanner driver 50 (device driver), and a scanner selection application 60.

The OS 30 manages the overall computer by providing, to many applications, basic functions such as an input/output function which controls outputs to the display device 22 and inputs from the input device 23, a memory management function of the auxiliary memory device 24, and the like. The OS 30 also includes a scan library 31 which controls the scan application 40 and the scanner driver 50. The scan library 31 provides an API (Application Program Interface) that implements communication with the scan application 40 and the scanner driver 50 in accordance with a predetermined image communication specification.

The scan application 40 is software that processes image data. For example, the scan application 40 is image editing software and image data character recognition software. In addition, for example, the scan application 40 instructs reading settings such as the original size, original type, input resolution, and the like and stores the scanned image in a file, and registers the frequently used reading settings as favorite settings.

When there are a plurality of scanners 10 or apparatuses including an image reading apparatus, a multifunctional peripheral having the function of an image reading apparatus, or the like to be used to perform a process, the scan application 40 selects and activates the scanner driver 50 corresponding to the scanner 10 to be used. Here, the scanner driver 50 generally conforms to a specification such as TWAIN (Technology Without An Interesting Name) or WIA (Windows Image Acquisition).

The scan application 40 includes an SL communication control unit 41, a scanner driver selection unit 42, a reading setting instruction unit 43, and a user setting management unit 44.

The SL communication control unit 41 obtains, via the scan library 31, image data from the scanner driver 50 conforming to a predetermined image communication specification. The scanner driver selection unit 42 selects the scanner driver 50 to be used if a plurality of scanner drivers 50 have been installed. The reading setting instruction unit 43 instructs reading settings such as the original size, original type, and input resolution for the user performing a scan on a setting screen (see FIG. 13). The user setting management unit 44 manages the setting information of the scanner 10 set by the user. For example, the user setting management unit 44 stores and manages, in the auxiliary memory device 24 or the like, the user setting information such as the current setting values designated by the reading setting instruction unit 43 or the favorite setting values which the user can set arbitrarily.

The scanner driver 50 is a driver that transmits commands to control the scanner 10 and receives image data and data representing the status of the scanner 10. The scanner driver 50 generally conforms to a specification such as TWAIN or WIA. The scanner driver 50 includes an SL communication control unit 51 and a user setting management unit 52.

The SL communication control unit 51 exchanges commands, conforming to a predetermined image communication specification, with the scan application 40 via the scan library 31. The SL communication control unit 51 accepts the original size and input resolution as reading settings, settings of a UI display mode which displays a setting screen specific to the scanner driver 50, and the like. The user setting management unit 52 stores, in the auxiliary memory device 24 or the like, the setting information instructed by the user on a reading setting screen (see FIG. 3) specific to the scanner driver 50, and manages them as the favorite setting values.

The scanner selection application 60 is software for selecting the scanner 10 to be used if a plurality of scanners 10 are connected to the PC 20 via the network. Further, the scanner selection application 60 has a function of monitoring the status of the scanner 10. Thus, when an instruction is received from the scanner 10 via the operation panel 16 of the scanner 10, the scanner selection application 60 implements a pseudo push scan in which the PC 20 requests image data from the scanner 10. The scanner selection application 60 includes an application activation unit 61, a scanner search unit 62, a scanner information management unit 63, a scanner status obtaining unit 64, a software obtaining unit 65, and a software setting information update unit 66.

The application activation unit 61 is a functional unit for activating the scan application 40. For example, when a scan instruction is received from the operation panel 16 of the scanner 10, the application activation unit 61 activates the scan application 40 and requests it to start a scan. The scanner search unit 62 detects the scanner 10 in communication with the PC 20 on the network. The scanner search unit 62 detects, for example, the scanner 10 using a Discovery protocol to which the scanner 10 corresponds.

The scanner information management unit 63 manages information of the scanner 10 connected to the PC 20, information of the corresponding scanner driver 50, and the like. For example, the scanner information management unit 63 registers and manages the IP address or the like of the scanner 10 connected to the PC 20. In addition, the scanner information management unit 63 is configured to be capable of selecting, based on a user operation, the scanner 10 to be used to perform a process. For example, the scanner 10 used to perform a process is selected based on a user operation on a scanner selection screen (see FIG. 4). Further, the scanner information management unit 63 deletes the scanner driver 50 that is no longer needed due to replacement of the scanner 10 or the like.

The scanner status obtaining unit 64 obtains the status of the scanner 10 connected onto the network. For example, the scanner status obtaining unit 64 monitors a scan execution event input on the operation panel 16 of the scanner 10 by polling at regular intervals. Examples of the status of the scanner 10 that can be obtained are, for example, a button event occurring status such as a scan execution event, a sleep status, and the like.

The software obtaining unit 65 obtains the scanner driver 50. For example, the software obtaining unit 65 communicates with a web server that distributes the scanner driver 50 to download and install the scanner driver 50 corresponding to the scanner 10 connected to the PC 20.

The software setting information update unit 66 performs data control for taking over the user setting values and the like of the scan application 40 or the scanner driver 50. For example, the software setting information update unit 66 performs the takeover when the scanner 10 to be used selected by the scanner information management unit 63 is switched to another scanner 10. As an example of the takeover, the software setting information update unit 66 makes at least a part of the setting data for performing a process by the original scanner 10 available for performing the process by another scanner 10. The setting data is, for example, information managed by the user setting management unit 44 or the user setting management unit 52.

A UI control unit 67 controls a UI screen displayed on the display device 22 of the PC 20. The UI screen will be described in the section of <User Interface>.

Note that respective functional units described above are merely examples. The function assigned to each functional unit can be designed as appropriate, and can be subdivided or integrated as compared with this embodiment.

<User Interface>

Figure 13:
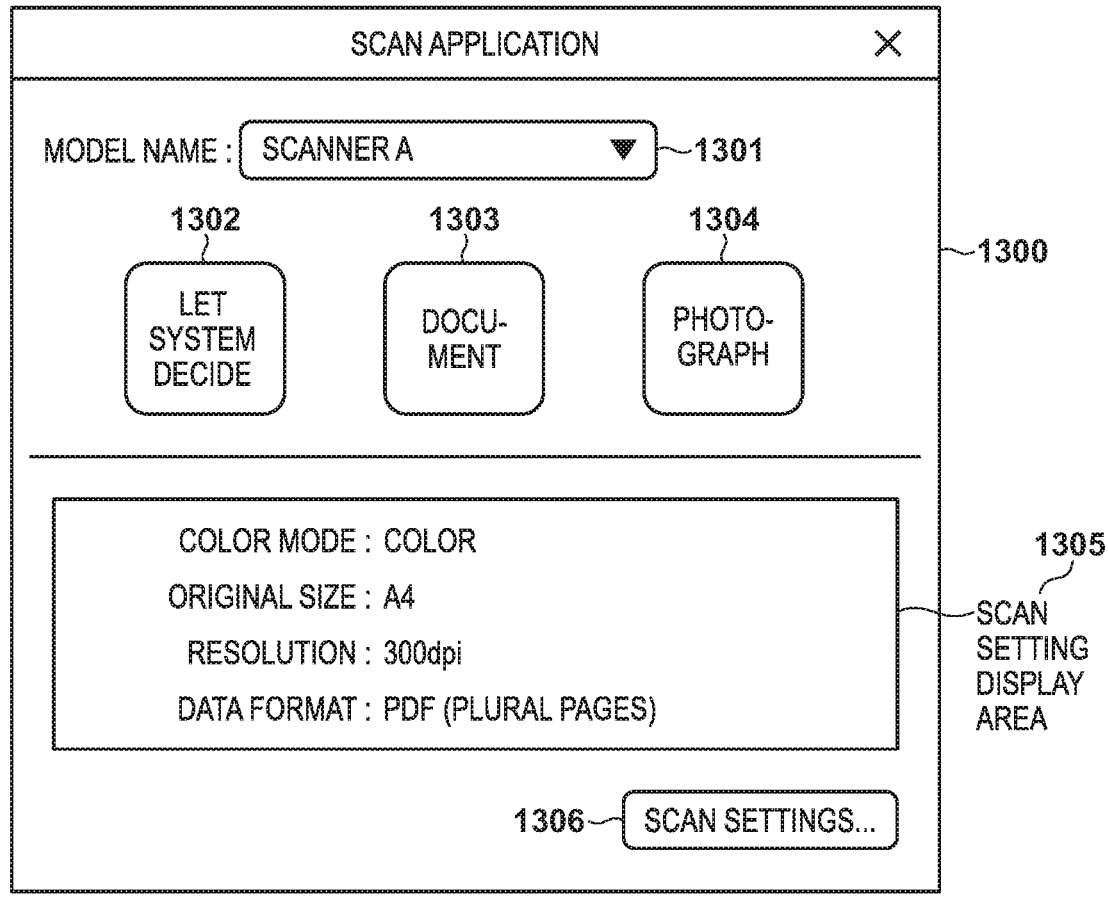
FIG. 13 is a view showing a main screen of a scan application.

The UI provided by each functional unit described above will be described. FIG. 13 is a view showing an example of the UI provided by the scan application 40, and shows a main screen 1300 of the scan application 40. The main screen 1300 is displayed, for example, on the display device 22 of the PC 20. The main screen 1300 includes a model name selection field 1301 in which the scanner 10 to be used can be selected, buttons 1302 to 1304 for performing a scan, a reading setting display area 1305, and a scan setting button 1306.

For example, the model name selection field 1301 is configured such that the user can select the scanner 10 to be used from a pull-down menu. The buttons 1302 to 1304 for performing a scan are provided for user selection and instruction. When the user selects one of these buttons, scan settings associated with the selected button are displayed on the reading setting display area 1305, and the user can check the setting contents. More specifically, for example, when a cursor displayed on the display device 22 of the PC 20 is overlapped on any one of the buttons 1302 to 1304 by a user operation using a mouse, the scan setting values are displayed in the reading setting display area 1305. When a click operation is performed by the mouse in that state, a scan corresponding to the clicked button among the buttons 1302 to 1304 is performed. The setting contents have been appropriately preset in accordance with the type of the original such as a document or a photograph. However, the setting contents such as the color mode, original size, resolution, data format, and the like can be changed on a scan setting screen (not shown) displayed upon pressing the scan setting button 1306. Here, the reading setting values are stored in the auxiliary memory device 24 or the like and managed by the user setting management unit 44 for each model. When the scanner 10 is changed in the model name selection field 1301, the reading setting value is updated to a default value or the previous setting value.

Figure 3:
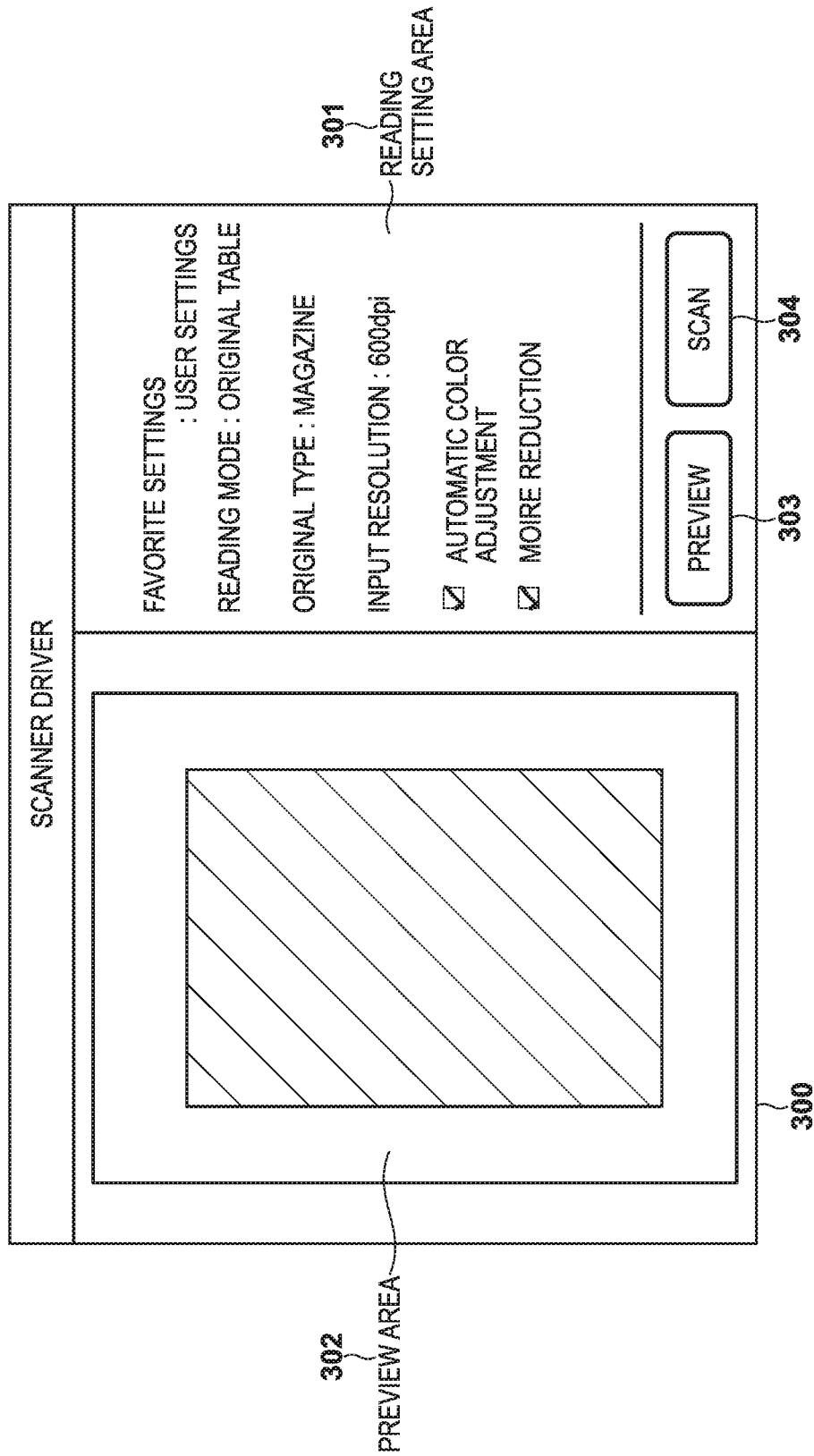
FIG. 3 is a view showing a scanner driver-specific reading setting screen.

FIG. 3 is a view showing an example of the UI provided by the scanner driver 50, and shows a reading setting screen specific to the scanner driver 50. The reading setting screen shown in FIG. 3 is displayed on the display device 22 of the PC 20. A reading setting screen 300 shown in FIG. 3 includes a reading setting area 301, a preview area 302, a preview button 303, and a scan button 304.

The setting information upon reading an original by the scanner 10 is displayed in the reading setting area 301. In this embodiment, pieces of information related to the favorite settings, reading mode, original type, input resolution, automatic color adjustment, and moire reduction are displayed as the setting information.

The preview area 302 is an area in which the preview image of the read original is displayed. Accordingly, the user can check the contents of the original before performing a scan. The preview button 303 is a button for performing a preview of the original. When the preview button 303 is pressed by the user using the input device 23, the scanner 10 reads the original at a low resolution and displays a preview image in the preview area 302.

The scan button 304 is a button for performing reading of the original. When the scan button 304 is pressed by the user using the input device 23, the scanner 10 reads the original. Then, the read image data is transmitted to the PC 20 via the network.

Note that when the original is read upon pressing the preview button 303, the original may be read at the same resolution as the reading resolution applied when the scan button 304 is pressed. In this case, the image data read upon pressing the preview button 303 may be transmitted to the PC 20 when the scan button 304 is pressed.

Figure 4:
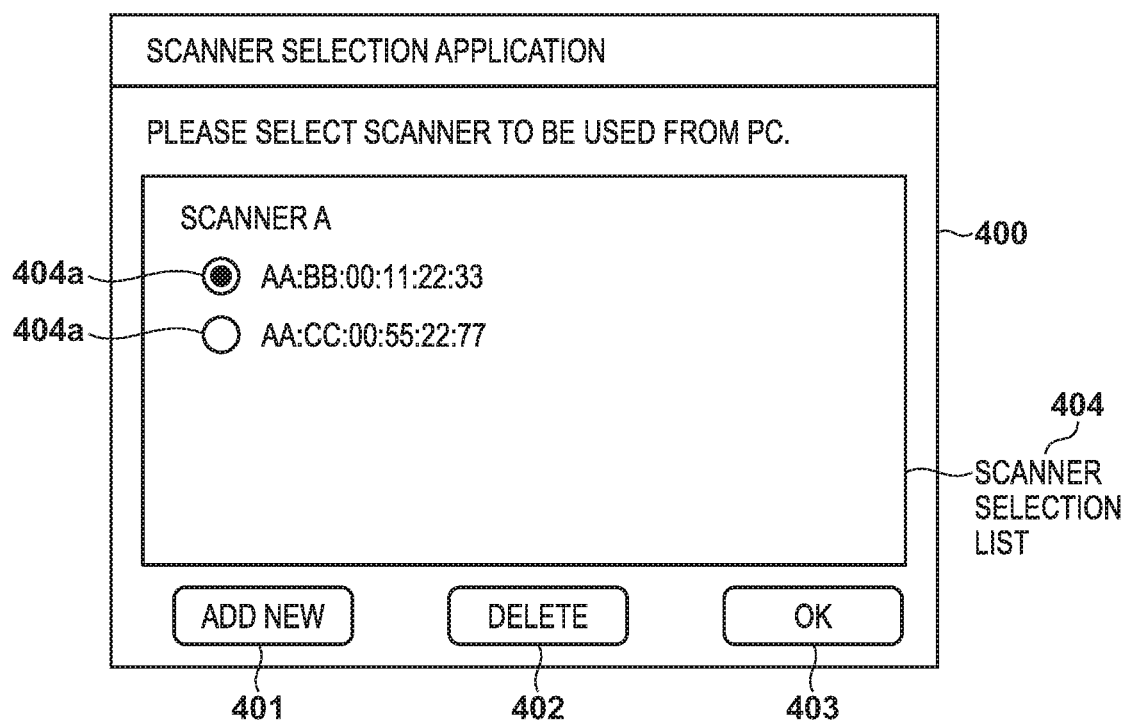
FIG. 4 is a view showing a scanner selection screen of a scanner selection application.

FIG. 4 is a view showing an example of the UI provided by the scanner selection application 60, and shows the scanner selection screen for selecting the scanner 10 to be used from the scanners 10 connected to the PC 20. A scanner selection screen 400 includes an "add new" button 401, a delete button 402, an OK button 403, and a scanner selection list 404.

The scanner selection list 404 is a list of the scanners 10 that have been registered in the PC 20 and can be used in accordance with an instruction from the PC 20. This list is, for example, stored in the auxiliary memory device 24 by the scanner information management unit 63. The scanner 10 that can be used is identified by the MAC address, and listed for each model in the scanner selection list 404. The list displayed in FIG. 4 corresponds to the connection state shown in FIG. 5 to be described later, and two scanners 10 each having the model name "scanner A" are displayed. The user can select the scanner 10 to be used by selecting a radio button 404a corresponding to the scanner 10 that the user wants to use and pressing the OK button 403.

The "add new" button 401 is a button for newly adding the scanner 10 to the scanner selection list 404. If the "add new" button 401 is pressed, a screen shown in FIG. 6 to be described later is displayed, and the scanner 10 is added to the scanner selection list 404 in accordance with the succeeding processing. The delete button 402 is a button for deleting the scanner 10 listed in the scanner selection list 404 from the list. When the radio button 404a corresponding to the scanner 10 that the user wants to delete is selected and the delete button 402 is pressed, the scanner 10 is deleted from the list.

Figure 6:
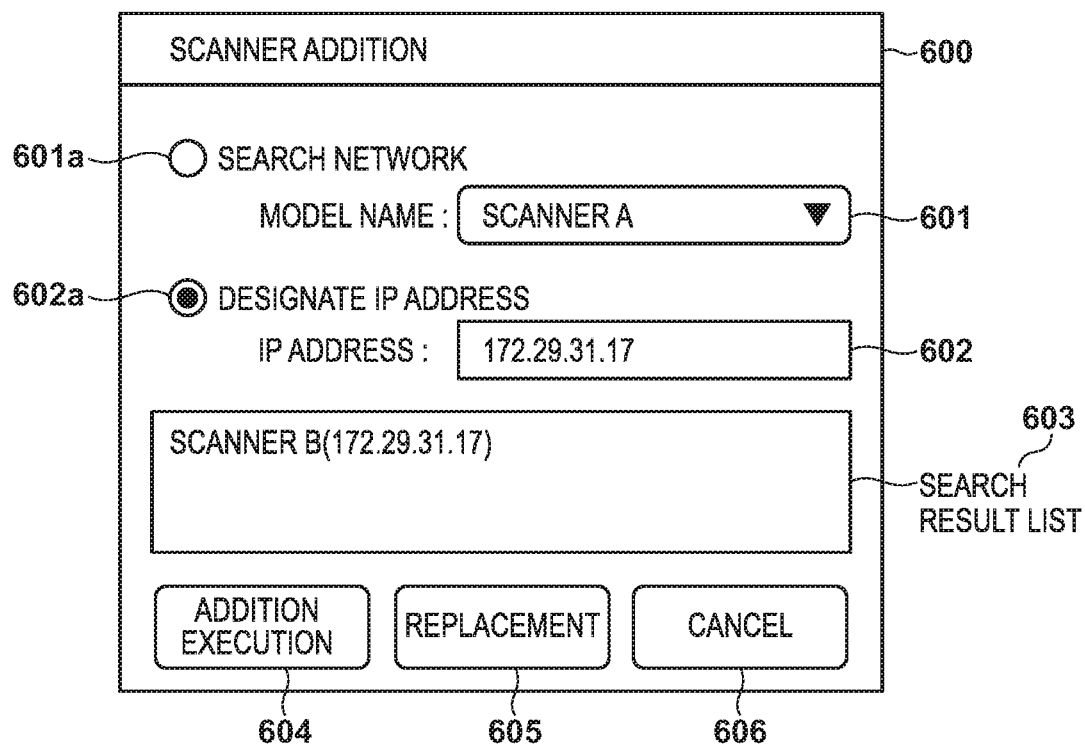
FIG. 6 is a view showing a scanner addition screen of the scanner selection application.

FIG. 6 is a view showing an example of the UI provided by the scanner selection application 60, and shows a scanner addition screen which is displayed after the "add new" button 401 on the scanner selection screen 400 shown in FIG. 4 is pressed. A scanner addition screen 600 includes a model name selection field 601, an IP address designation field 602, a search result list 603, an addition execution button 604, a replacement button 605, and a cancel button 606.

The model name selection field 601 is used to designate the model name as a search parameter to search for the new scanner 10 on the network. For example, the user selects the model name to be designated from a pull-down menu. The IP address designation field 602 is used to designate the IP address. For example, the user inputs the IP address to be designated in a text box. Here, the scanner 10 is searched for based on the model name selected in the model name selection field 601 if a radio button 601a is selected, and is searched for based on the IP address written in the IP address designation field 602 if a radio button 602a is selected.

The addition execution button 604 is a button for adding the scanner 10 listed in the search result list 603 to the scanner selection list 404 shown in FIG. 4. The replacement button 605 is a button for replacing the scanner 10 currently selected to be used by the PC 20 with the scanner 10 listed in the search result list 603.

The search result list 603 is a list showing the search result based on the condition designated in the model name selection field 601 or the IP address designation field 602. If the user selects, using the input device 23, any one of the scanners 10 displayed in the search result list 603 and presses the addition execution button 604 or the replacement button 605, processing corresponding to the pressed button is executed.

FIG. 8 is a view showing an example of the UI provided by the scanner selection application 60, and shows a scanner selection screen for selecting the scanner 10 to be used from the scanner 10 connected to the PC 20. FIG. 8 is different from FIG. 4 in that the scanner 10 is identified by the model name and the MAC address in FIG. 4 but the scanner 10 is identified by the model name and the IP address assigned to the scanner 10 in FIG. 8. A scanner selection screen 800 includes a scanner selection list 801, an "add new" button 802, a delete button 803, and an OK button 804.

The scanner selection list 801 lists the user-friendly name, model name, and IP address of the registered scanner 10 as its attribute information. The user-friendly name is a name that facilitates the user to identify the scanner 10 by a nickname, and can be edited on a screen for adding the scanner 10 shown in FIG. 10.

The "add new" button 802 is a button for newly adding the scanner 10 to the scanner selection list 801. If the "add new" button 802 is pressed, a screen shown in FIG. 10 to be described later is displayed, and the scanner 10 is added to the scanner selection list 801 in accordance with the succeeding processing. The delete button 803 and the OK button 804 have functions similar to those of the delete button 402 and the OK button 403 shown in FIG. 4, respectively.

Figure 10:
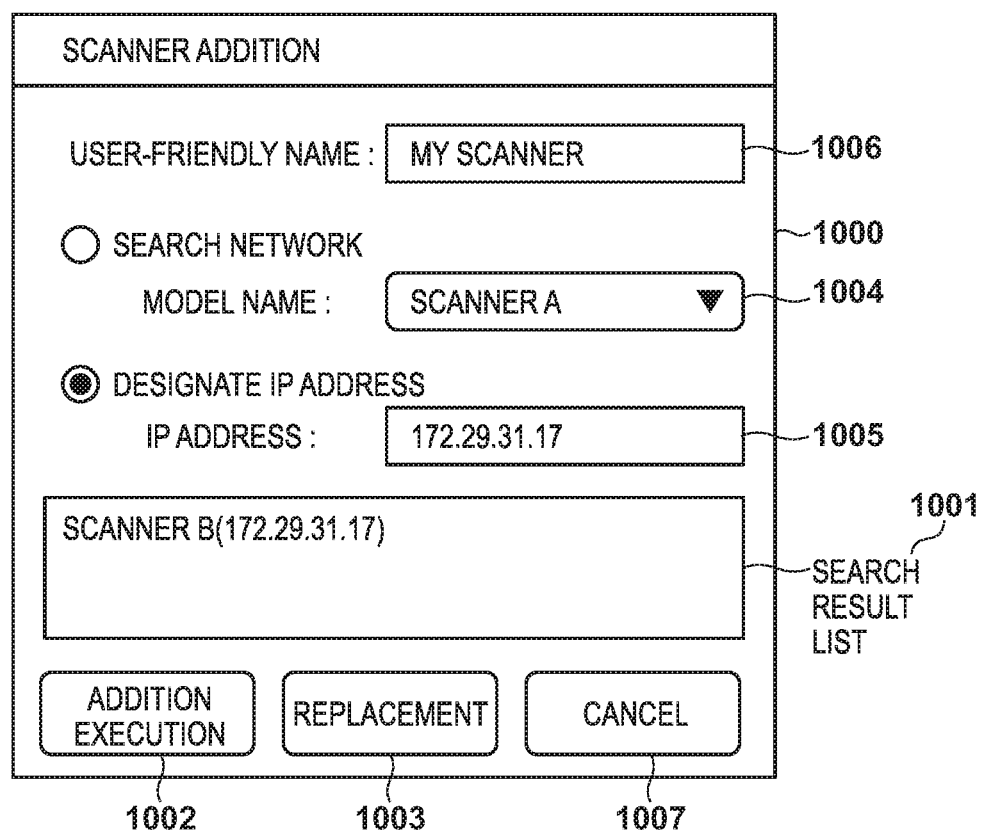
FIG. 10 is a view showing a scanner addition screen of the scanner selection application.

FIG. 10 is a view showing an example of the UI provided by the scanner selection application 60. FIG. 10 shows the screen for adding the scanner 10, which is displayed after the "add new" button 802 is pressed on the scanner selection screen 800 of the scanner selection application 60 shown in FIG. 8. An addition screen 1000 includes a user-friendly name designation field 1006, a model name selection field 1004, an IP address designation field 1005, a search result list 1001, an addition execution button 1002, a replacement button 1003, and a cancel button 1007.

In the user-friendly name designation field 1006, the user-friendly name of the scanner 10 to be added can be designated by inputting the user-friendly name in a text box. The model name selection field 1004, the IP address designation field 1005, and the search result list 1001 have functions similar to those of the model name selection field 601, the IP address designation field 602, and the search result list 603 shown in FIG. 6, respectively. Further, the addition execution button 1002, the replacement button 1003, and the cancel button 1007 have functions similar to those of the addition execution button 604, the replacement button 605, and the cancel button 606 shown in FIG. 6, respectively.

Note that in accordance with the use environment of the PC 20 and the scanner 10, one of the UI screen shown in FIG. 4 and the UI screen shown in FIG. 8 can be used. For example, the user may set any one of the UI screens to be used. In addition, the scanner selection application 60 may check whether the IP address of each of the registered scanners 10 is the fixed IP address or the automatically obtained IP address, and display the screen shown in FIG. 4 if the automatically obtained IP address is included, or display the screen shown in FIG. 8 if only the fixed IP address is included.

Figure 12:
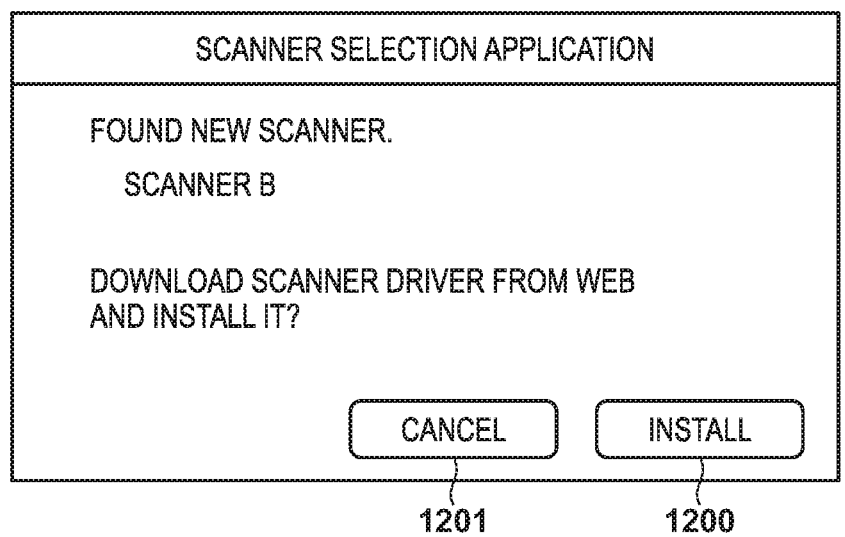
FIG. 12 is a view showing a screen for checking download of a scanner driver.

FIG. 12 is a view showing an example of the UI provided by the scanner selection application 60, and shows a screen for checking whether to install a device driver corresponding to the detected scanner 10. As will be described later, this screen is displayed when the scanner 10 is periodically monitored and the scanner 10 of a model different from that of the registered scanner 10 is detected. The scanner selection application 60 executes installation if an install button 1200 is pressed, and does not execute installation if a cancel button 1201 is pressed.

FIG. 15 is a view showing an example of the UI provided by the scanner selection application 60, and shows a screen for installing the scanner driver 50. Alternatively, the screen shown in FIG. 15 is displayed by, for example, the OS 30 or software (not shown) such as a driver installer. If the scanner 10 assigned with the IP address not registered in the scanner information management unit 63 is detected, or if the IP address of the scanner 10 is automatically obtained, the installation screen is displayed to prompt the user to check whether to execute installation. Further, the installation screen includes a check box 1500, so that enabling/disabling of the automatic replacement setting to be described later can be switched.

Operation of Scanner Selection Application 60

Processing Example 1

Figure 5:
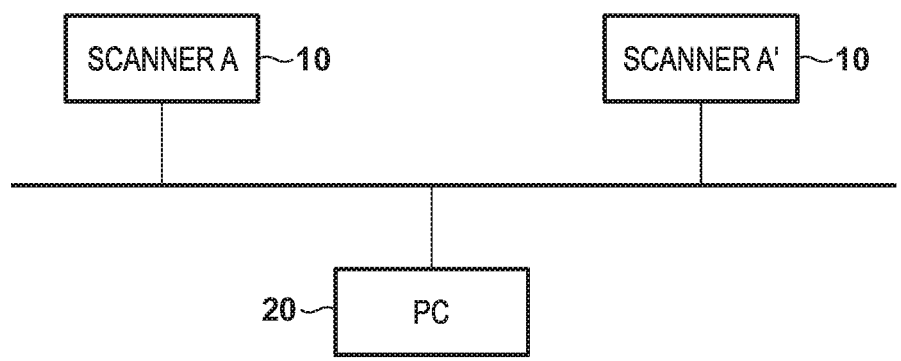
FIG. 5 is a view showing a connection form between the PC and scanners.

FIG. 5 is a view showing a state in which the PC 20 is connected to the plurality of scanners 10 on the network. The PC 20 can be simultaneously connected to the plurality of scanners 10 via the network. In FIG. 5, two scanners 10 of the same model are connected to the PC 20. In the example shown in FIG. 5, the scanner 10 is identified by the model name and the MAC address.

Figure 7:
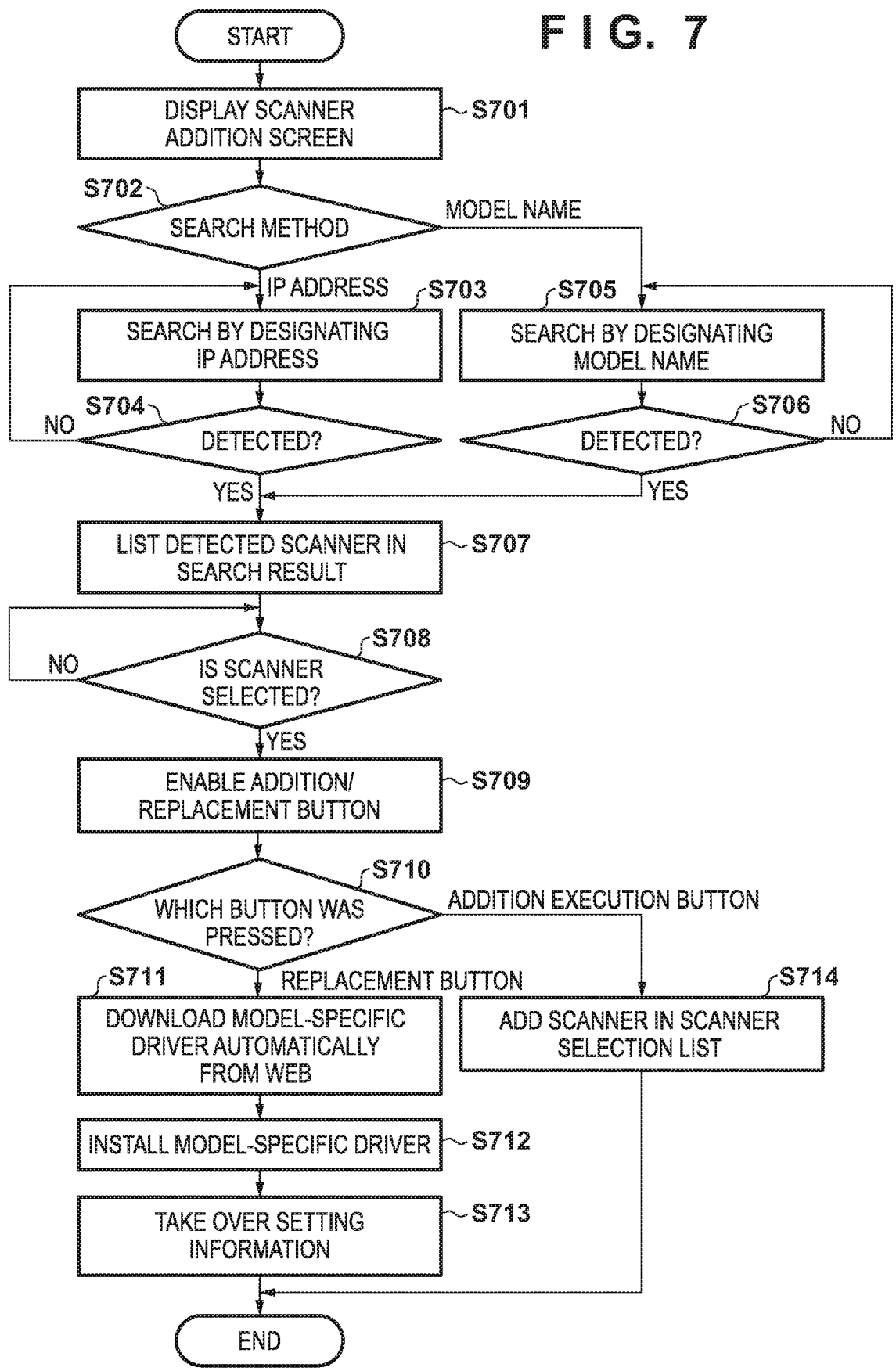
FIG. 7 is a flowchart illustrating processing of the scanner selection application.

FIG. 7 is a flowchart illustrating an example of processing of the scanner selection application 60 executed when the scanner 10 is replaced. For example, the processing of this flowchart is executed by the CPU 25 loading, into the RAM 27, programs stored in the ROM 26 or the auxiliary memory device 24 and executing them to function as the respective functional units of the scanner selection application 60. FIG. 7 shows an example of processing executed when, in the connection state shown in FIG. 5, the scanner 10 with the model name "scanner B" is newly connected and the scanner 10 to be used is replaced with the scanner B. The processing of this flowchart is started, for example, when the scanner selection application 60 is activated and the "add new" button 401 in FIG. 4 is pressed.

In step S701, the UI control unit 67 displays the scanner addition screen 600 shown in FIG. 6. Thus, the user can designate the search method of the scanner 10. In this embodiment, the search method includes a search method in which the model name is designated in the model name selection field 601 and used for a search, and a search method in which the IP address is input in the IP address designation field 602 and used for a search. Note that in this stage, the addition execution button 604 and the replacement button 605 are disabled, so the corresponding processing cannot be accepted.

In step S702, the scanner search unit 62 checks the search method of the scanner 10. If the search by the model name is designated, the process advances to step S705, and if the search by the IP address is designated, the process advances to step S703. For example, the scanner search unit 62 checks the search method based on the radio buttons 601a and 602a in the scanner addition screen 600.

In step S705, the scanner search unit 62 performs a search using the model name as the search parameter. For example, the scanner search unit 62 performs broadcast communication to obtain the model name of the device on the network to which the PC 20 is connected. Then, it is determined whether the obtained model name coincides with the model name designated in the model name selection field 601. Alternatively, the scanner search unit 62 may perform broadcast communication while designating the model name designated in the model name selection field 601, and only a device corresponding to the designated model name may respond to the PC 20. Then, in step S706, the scanner search unit 62 checks whether the scanner 10 corresponding to the model name designated in the model name selection field 601 is detected by the search, and if the scanner 10 is detected, advances the process to step S707. In step S707, the UI control unit 67 displays the scanner 10 detected by the scanner search unit 62 in the search result list 603, and advances the process to step S708. More specifically, in step S707, the IP address and the model name of the device whose model name is determined to coincide with the model name designated in the model name selection field 601 as described above, both the IP address and the model name being used in the search by broadcast communication, are displayed. On the other hand, if no scanner 10 is detected by the scanner search unit 62, the process returns to step S705 to repeat the processing.

In step S703, the scanner search unit 62 performs a search using the IP address as the search parameter. For example, the scanner search unit 62 performs unicast communication using the IP address input in the IP address designation field 602 and, if there is a communication partner device, obtains the model name from the device. Then, in step S704, the scanner search unit 62 checks whether the scanner 10 is detected (whether the model name is obtained) by the search, and if the scanner 10 is detected, advances the process to step S707. In step S707, the UI control unit 67 displays the scanner 10 detected by the scanner search unit 62 in the search result list 603, and advances the process to step S708. More specifically, in step S707, the IP address used in the search by unicast communication (the IP address input in the IP address designation field 602) and the model name obtained from the detected device are displayed. On the other hand, if no scanner 10 is detected by the scanner search unit 62, the process returns to step S703 to repeat the processing. Note that in a case in which no scanner 10 is detected in one of steps S704 and S706, if no scanner 10 is detected even after the search is repeated a predetermined number of times or for a predetermined period, a notification indicating that no scanner 10 is detected may be provided to the user.

In step S708, the scanner information management unit 63 checks whether the detected scanner 10 is selected in the search result list 603 by the user. If the detected scanner 10 is selected, the process advances to step S709; otherwise, the determination in step S708 is repeated. In this embodiment, the search result list 603 is configured such that the user can select any one of the scanners 10 in the list using the input device 23 such as a mouse.

In step S709, the UI control unit 67 enables the addition execution button 604 and the replacement button 605 on the scanner addition screen 600, and advances the process to step S710. Thus, the operation of either of these buttons by the user becomes acceptable.

In step S710, the scanner information management unit 63 checks the button pressed by the user. If the addition execution button 604 is pressed, the process advances to step S714. The UI control unit 67 closes the scanner addition screen 600, and adds the selected scanner 10 (the scanner B in this example) to the scanner selection list 404 in the scanner selection screen 400 shown in FIG. 4.

On the other hand, if the replacement button 605 is pressed, the scanner information management unit 63 switches the scanner 10 used to perform a process to the scanner 10 selected by the user in step S708, and advances the process to step S711. In step S711, the software obtaining unit 65 of the scanner selection application 60 communicates with the web server that distributes the scanner driver 50 and downloads the scanner driver 50. Thereafter, in step S712, the software obtaining unit 65 installs the downloaded scanner driver 50.

In step S713, the software setting information update unit 66 executes processing for taking over the user setting values and the like of the scan application 40 or the scanner driver 50 from the scanner 10 before the replacement to the scanner 10 after the replacement.

For example, in the example shown in FIG. 5, the software setting information update unit 66 may request the scanner driver 50 corresponding to a scanner A and the scanner driver 50 corresponding to the scanner B to perform replacement. Thus, at least a part of the information managed by the user setting management unit 52 of the scanner driver 50 of the scanner A may be stored in and managed by the user setting management unit 52 of the scanner driver 50 of the scanner B. That is, at least a part of the setting information managed by the user setting management unit 52 of the scanner driver 50 of the scanner A is stored in the user setting management unit 52 of the scanner driver 50 of the scanner B. Therefore, even after the replacement from the scanner A to the scanner B, the user can easily designate these settings and cause the scanner B to perform a scan in accordance with the settings. The setting information includes at least one of the favorite settings, reading mode, original type, reading resolution, and the image processing settings such as automatic color adjustment and moire detection with respect to the read image data. Note that the reading mode indicates a member to set the original in the scanner, and indicates, for example, whether the original placed on the original table of the scanner is read or the original set in an auto document feeder is read.

In addition, for example, the software setting information update unit 66 may request the scan application 40 to make the current setting values, favorite setting values (reading settings such as the original size, original type, and input resolution), or the like of the scanner A stored in and managed by the user setting management unit 44 available with the scanner B. Therefore, even after the replacement from the scanner A to the scanner B, the user can easily designate these settings using the scan application 40 and cause the scanner B to perform a scan in accordance with the settings.

Additionally or alternatively, the software setting information update unit 66 may be configured to update a predetermined file related to the user settings which the scan application 40 or the scanner driver 50 refers to.

According to the processing described above, it is possible to take over the settings of the scanner 10 before the replacement to the scanner 10 after the replacement without the user having to manually set up again, so that user convenience further improves. By performing the replacement as described above, the selection item selected in the model name selection field 1301 of the main screen 1300 of the scan application 40 is updated from the scanner A to the scanner B. In addition, the setting information such as the favorite settings for each scanner 10 managed by the user setting management unit 44 is taken over from the scanner A to the scanner B.

Note that if the model-specific driver has been already installed, for example, if the scanner A is connected and another scanner A of the same model is to be further connected, processing in steps S711 and S712 may be omitted. That is, when the scanner 10 selected by the scanner information management unit 63 is switched, if the scanner driver 50 corresponding to the scanner 10 after the switching has not been installed yet, the software obtaining unit 65 may obtain the scanner driver 50. Further, in the example of the flowchart shown in FIG. 7, the addition button 603 and the replacement button 604 are enabled based on selection of any one of the scanners 10 in the search result list 603. However, these buttons may be always selectable, and an error message may be displayed when one of these buttons is pressed while no scanner 10 is selected in the search result list 603.

Processing Example 2

FIG. 9 is a view showing the connection state of the PC 20 in a case in which the scanner 10 (scanner A) connected onto the network is replaced with the scanner 10 (scanner B) of another model. This assumes a case in which, for example, the scanner A connected onto the network is replaced with the scanner B of another model because the scanner A has become old or broken down. In this embodiment, it is set on the device side that a fixed IP address is used for the scanner A and the scanner B. Accordingly, it is set on the PC 20 side that the same IP address as the scanner A before the replacement is assigned to the scanner B after the replacement.

Figure 11:
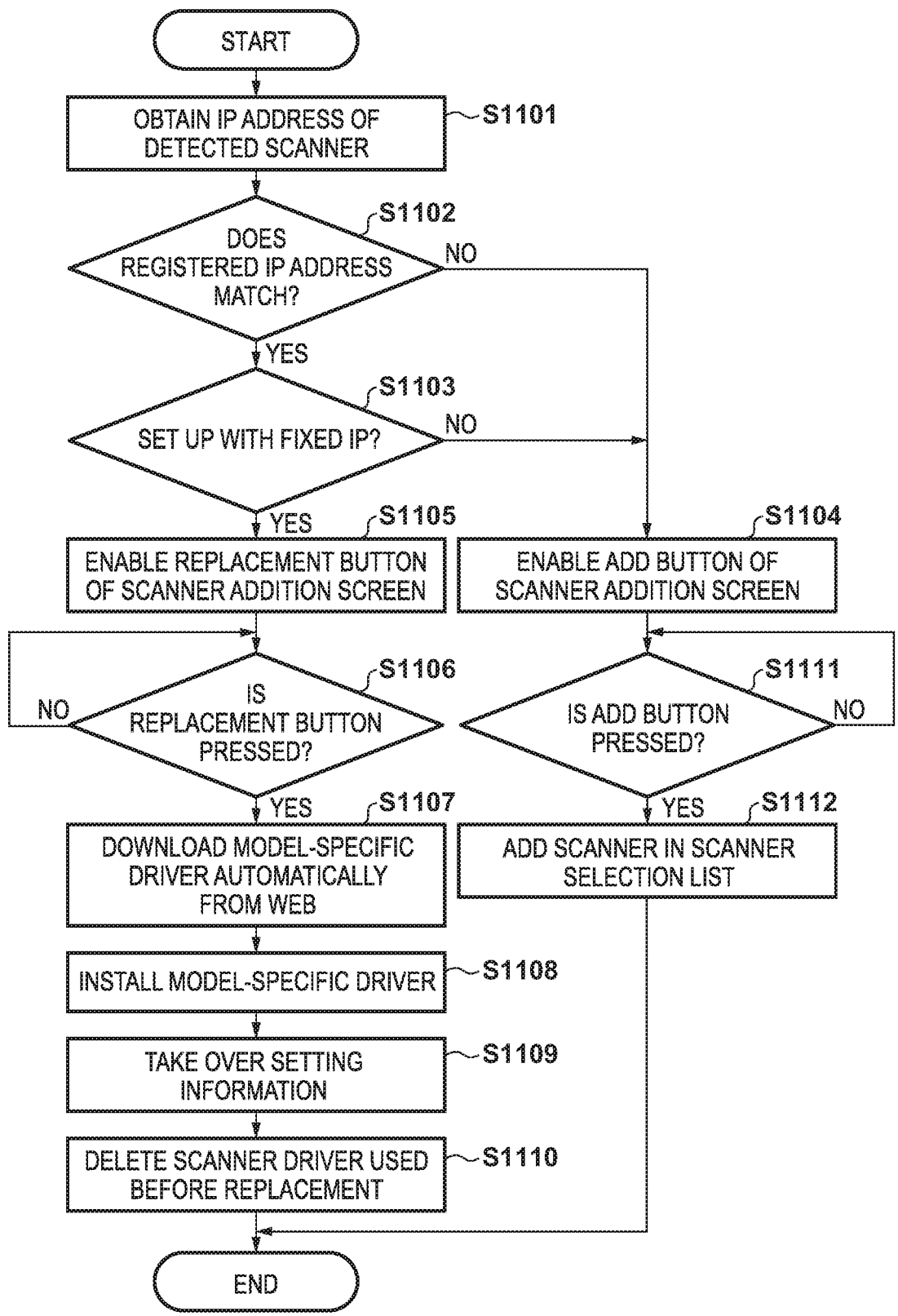
FIG. 11 is a flowchart illustrating processing of the scanner selection application.

FIG. 11 is a flowchart illustrating an example of processing of the scanner selection application 60. The flowchart of FIG. 11 is different from the flowchart of FIG. 7 in that the processing is executed in a case in which the scanner 10 is identified by the model name and the IP address and the scanner on the network is not added but replaced. That is, in FIG. 11, the scanner A is disconnected from the network after the replacement. For example, the processing of this flowchart is executed by the CPU 25 loading, into the RAM 27, the programs stored in the ROM 26 or the auxiliary memory device 24 and executing them to function as the respective functional units of the scanner selection application 60. FIG. 11 illustrates the processing of the scanner selection application 60 executed when the connected scanner A is replaced with the scanner B as shown in FIG. 9. This flowchart is started when the scanner search unit 62 detects the scanner 10 while the scanner addition screen 1000 shown in FIG. 10 is displayed. Note that upon detecting the scanner 10, the processing similar to that from step S702 to step S707 illustrated in FIG. 7 may be executed, and the scanner 10 may be detected by designating the IP address or the model name.

In step S1101, the scanner search unit 62 obtains the IP address of the detected scanner 10. Then, in step S1102, the scanner information management unit 63 compares the IP address obtained in step S1101 with the IP address of the registered scanner. With reference to the example shown in FIG. 9, the IP address of the detected scanner 10 (scanner B) is compared with the IP address of the registered scanner 10 (scanner A). If the obtained IP address coincides with the registered IP address, the process advances to step S1103; otherwise, the process advances to step S1104.

In step S1103, the scanner information management unit 63 checks whether the detected scanner 10 has been set up with a fixed IP address. If the detected scanner 10 has been set up with a fixed IP address, it is determined that replacement of the scanner 10 has been performed, and the process advances to step S1105 to enable the replacement button 1003 of the screen for adding the scanner 10. On the other hand, if the detected scanner 10 has not been set up with a fixed IP address, the process advances to step S1104.

For example, the following method is used to check whether the detected scanner 10 has been set up with a fixed IP address. That is, in the install processing of the scanner driver 50, the installer records the designation information in a shared memory or shared file of the OS 30 upon designating the IP address, and the scanner information management unit 63 refers to the shared information to perform determination. Alternatively, in a case in which the scanner driver 50 has not been installed yet as in the example shown in FIG. 9, or the like, the scanner selection application 60 may directly communicate with the scanner 10. Then, the scanner selection application 60 may inquire whether a fixed IP address has been assigned or a dynamic IP address has been assigned by the DHCP function of a router or the like.

In step S1106, the scanner information management unit 63 checks whether the replacement button 1003 is pressed on the screen for adding the scanner 10. If the replacement button 1003 is pressed, the scanner B is selected as the scanner 10 to be used to perform a process, and the process advances to step S1107. On the other hand, if the replacement button is not pressed, the scanner information management unit 63 repeats the processing in step S1106. Steps S1107 to S1109 are similar to steps S711 to S713, respectively. In step S1110, the scanner information management unit 63 deletes the scanner driver 50 corresponding to the scanner A used before the replacement, and the process is terminated.

On the other hand, if the process advances from step S1102 or S1103 to step S1104, the UI control unit 67 enables the addition execution button 1002 of the scanner addition screen 1000. In step S1111, the scanner information management unit 63 checks whether the addition execution button 1002 is pressed by the user. If the addition execution button 1002 is pressed, the detected scanner 10 is added to the scanner selection list 801 shown in FIG. 8 in step S1112, and the process is terminated. On the other hand, if the addition execution button 1002 is not pressed, processing in step S1111 is repeated.

According to the processing described above, by the user pressing the replacement button, the scanner driver 50 is installed and the favorite settings and the like are taken over, so that user convenience can be improved. Particularly, in the procedure of the processing in FIG. 11, the settings and the like are taken over if the obtained IP address coincides with the IP address of the scanner 10 before the replacement. In such a case, it can be assumed that the user wants to use the scanner 10 after the replacement while using the same settings as the scanner 10 before the replacement. By taking over the settings and the like in such a case, user convenience can be improved.

Note that the check screen shown in FIG. 12 may be displayed before the processing of step S1107. In addition, whether one of the buttons is pressed is checked in one of steps S1106 and step S1111, but if the button is not pressed by a user operation for a predetermined time, this flowchart may be terminated without performing the corresponding processing of replacement or addition. Furthermore, if it is checked in step S1103 that the scanner 10 after the replacement has been set up with the fixed IP address, the replacement processing may be automatically executed without executing processing of steps S1105 and S1106.

Processing Example 3

Next, replacement of the scanner 10 in cooperation with a function of the scanner selection application 60 to monitor the status of the scanner 10 will be described. In this embodiment, the scanner selection application 60 has a function of monitoring the status of the scanner 10 to implement a pseudo push scan in which the PC 20 that has received a scan instruction from the operation panel 16 of the scanner 10 requests image data from the scanner 10.

Figure 14A:
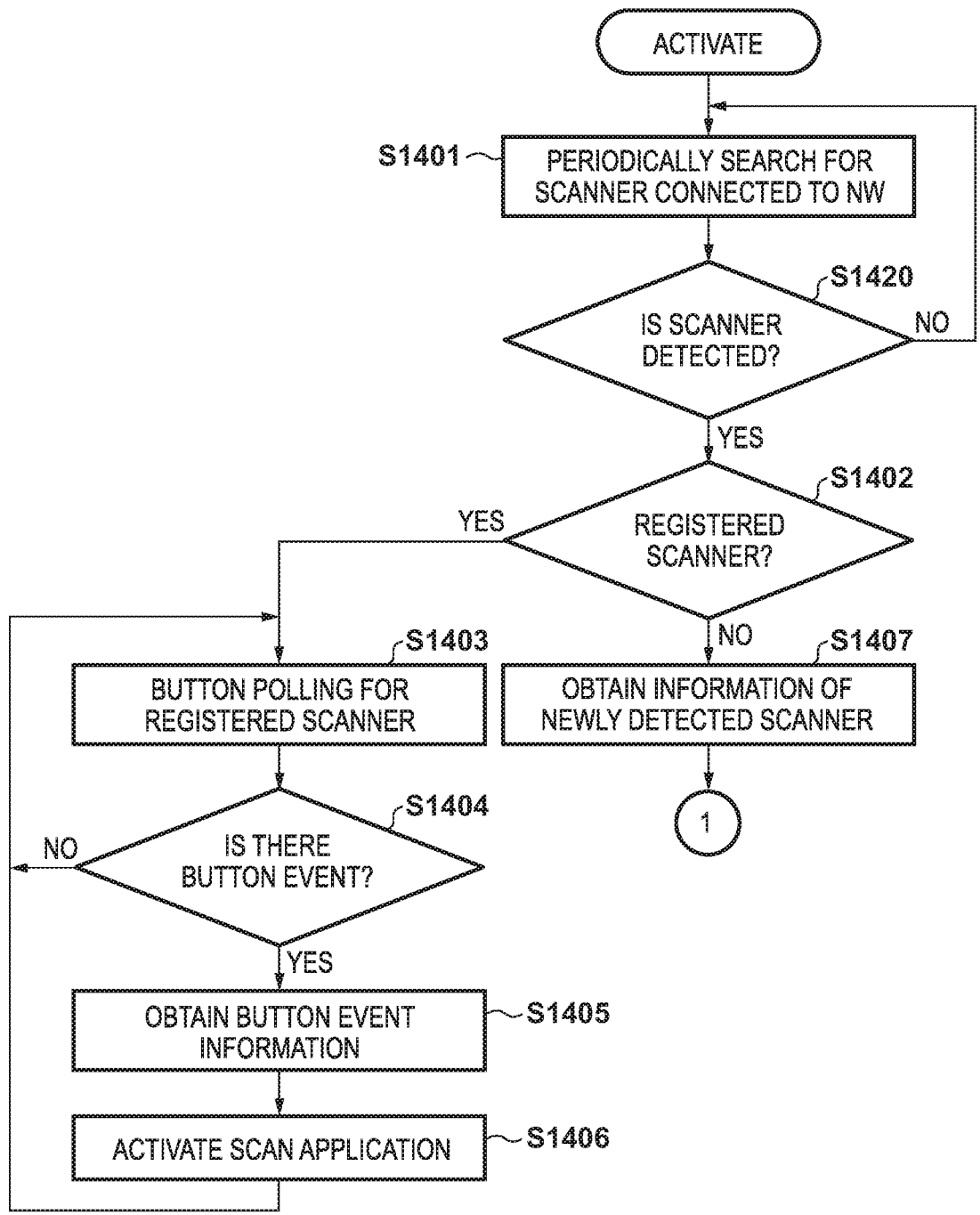
FIG. 14A is a flowchart illustrating processing of the scanner selection application.
Figure 14B:
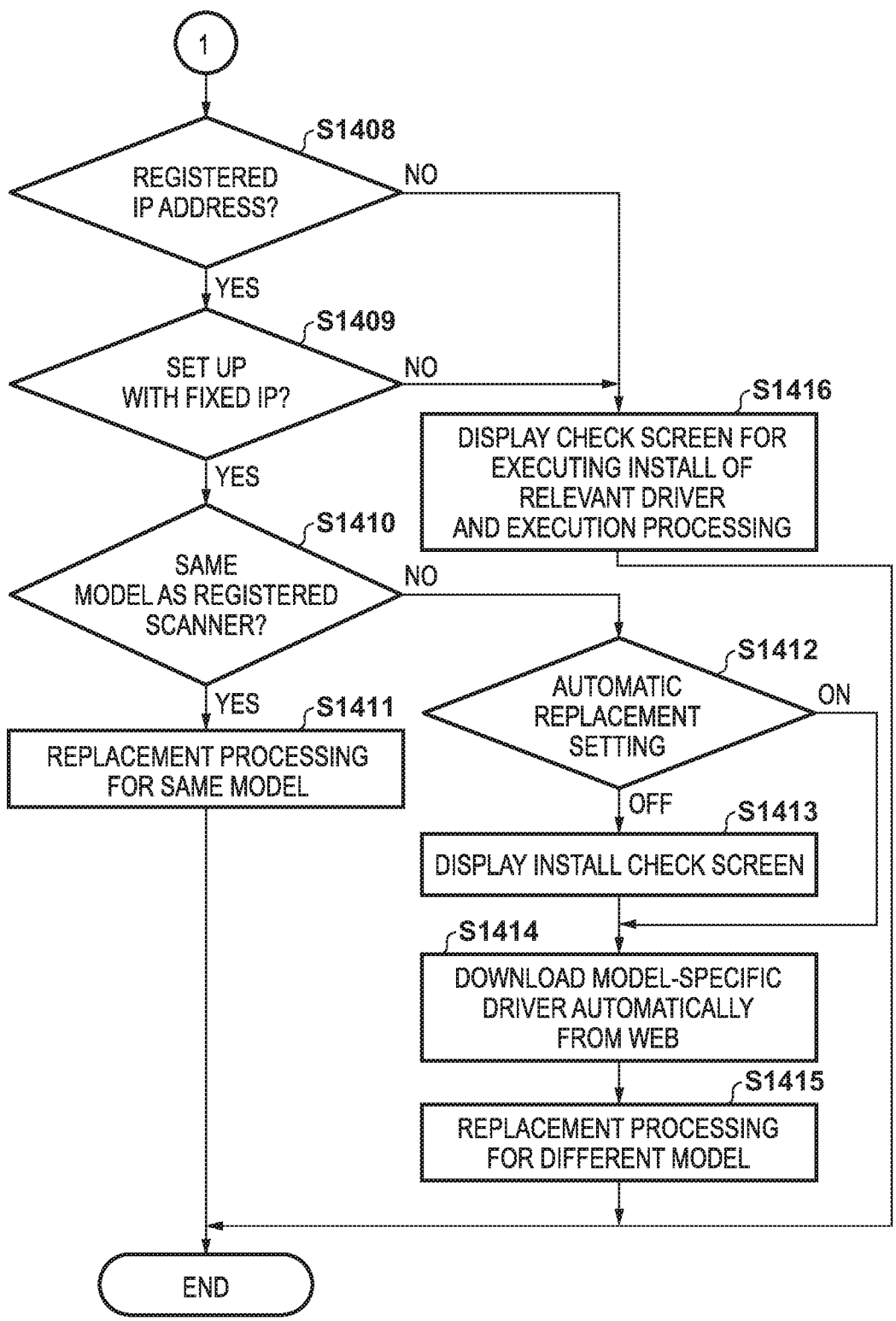
FIG. 14B is a flowchart illustrating processing of the scanner selection application.

FIG. 14A and FIG. 14 B is a flowchart illustrating an example of processing of the scanner selection application 60. The flowchart of FIG. 14A and FIG. 14B illustrates processing executed when the status of the scanner 10 is monitored by the scanner selection application 60 while it is running, and if replacement of the scanner 10 is detected, the scanner driver 50 is automatically replaced with the scanner driver 50 corresponding to the scanner after the replacement. For example, the processing of this flowchart is executed by the CPU 25 loading, in the RAM 27, the programs stored in the ROM 26 or the auxiliary memory device 24 and executing them to function as the respective functional units of the scanner selection application 60. In this embodiment, the processing of this flowchart is started when the scanner selection application 60 is activated.

In step S1401, the scanner search unit 62 periodically searches for the scanner 10 connected onto the network. For example, the scanner search unit periodically searches for the scanner 10 using a Discovery protocol corresponding to the scanner 10 connected onto the network. In step S1420, the scanner search unit 62 checks whether the scanner 10 is detected in the search in step S1401. If the scanner 10 is detected, the process advances to step S1402. If no scanner 10 is detected, the process returns to step S1401 and the periodical search is repeated.

In step S1402, the scanner search unit 62 checks whether the detected scanner 10 is the registered scanner 10. If the detected scanner 10 is the registered scanner 10, the process advances to step S1403. If the detected scanner 10 is not the registered scanner 10, that is, the scanner 10 is newly detected, the process advances to step S1407. For example, the scanner search unit 62 uses the MAC address to check whether the scanner 10 has already been registered.

In step S1403, the scanner status obtaining unit 64 performs polling at regular intervals to monitor a scan execution event on the operation panel 16 of the scanner 10, and advances the process to step S1404. In step S1404, the scanner status obtaining unit checks whether a button event is detected. If a button event is detected, the process advances to step S1405, and the scanner status obtaining unit obtains the detailed information of the button event from the scanner 10. If no button event is detected, the process returns to step S1403, and the processing therein is repeated. A button event is, for example, a scan execution event.

In step S1406, the scan application 40 is activated by the application activation unit 61. Then, the scan application 40 determines the reading settings from the detailed information of the button event, and starts a scan. On the other hand, the scanner selection application 60 returns to step S1403 and repeats the processing therein. Alternatively, the process may return to step S1401 after the processing in step S1406.

If the scanner 10 detected in step S1401 is not the registered scanner 10, the scanner search unit 62 obtains the device information such as the IP address and the model name of the newly detected scanner 10 in step S1407. In step S1408, the scanner information management unit 63 checks whether the obtained IP address is the registered IP address. If the obtained IP address is the registered IP address, the scanner information management unit 63 advances the process to step S1409; otherwise, advances the process to step S1416. In step S1409, the scanner information management unit 63 checks whether the detected scanner 10 has been set up with a fixed IP address. If the detected scanner 10 has been set up with a fixed IP address, the scanner information management unit 63 advances the process to step S1410; otherwise, advances the process to step S1416. In step S1410, the scanner information management unit 63 collates the model name of the detected scanner 10 to check whether the detected scanner 10 is the same model as the registered scanner 10. If the detected scanner 10 is the same model as the registered scanner 10, the scanner information management unit 63 advances the process to step S1411; otherwise, advances the process to step S1412.

In step S1411, the software setting information update unit 66 executes replacement processing for the same model, and the processing of the flowchart is terminated. In the replacement processing for the same model, processing similar to that from step S1107 to step S1110 in FIG. 11 is executed. At this time, the newly detected scanner 10 is internally selected without displaying it on the scanner selection screen 400 shown in FIG. 4, and the user setting values such as favorite settings of the scan application 40 are taken over. Further, for example, the software setting information update unit 66 may request of the scanner driver 50 that at least some of the user setting values set for the scanner 10 before the replacement can be used with the scanner 10 after the replacement.

In step S1412, the scanner information management unit 63 checks whether automatic replacement setting for a different model is enabled. If the setting is not enabled (the setting is OFF), the process advances to step S1413. If the setting is enabled (the setting is ON), the process advances to step S1414. The user can select to enable/disable the automatic replacement setting by checking/unchecking the check box 1500 on the installation screen shown in FIG. 15. Alternatively, the setting function of the scanner selection application 60 may be configured to be capable of changing the setting content after the installation.

In step S1413, the UI control unit 67 displays a screen as shown in FIG. 12 to check whether to download, from a web server, and install the scanner driver 50.

In step S1414, the software obtaining unit 65 communicates with a web server that distributes the scanner driver 50, and downloads the scanner driver 50 corresponding to the newly connected scanner 10. That is, if the automatic replacement setting is enabled, the download is started without prompting the user for a check as in step S1413. Thereafter, the software obtaining unit 65 installs the downloaded scanner driver 50.

In step S1415, the software setting information update unit 66 executes different model replacement processing. More specifically, the processing is similar to the processing from step S1108 to step S1110 of the flowchart in FIG. 11, so that the description thereof is omitted herein.

According to the processing described above, since the scanner information obtaining unit 64 periodically obtains the status of the scanner 10, it is possible to execute processing in accordance with detection of the event button of the connected scanner 10 and perform takeover of the setting data and the like if the scanner 10 is newly detected. In addition, since the scanner selection application 60 automatically installs the scanner driver 50 corresponding to the newly detected scanner 10 and performs takeover of the favorite settings or the like, user convenience can be improved.

As has been described above, according to the embodiments described above, the setting information is taken over when the device to be used is changed, so that there is no need to manually perform setting again. Therefore, user convenience can be further improved.

Note that in the description of each flowchart described above, the functional unit as which the CPU 25 functions in each step is merely an example, and can be designed as appropriate. In addition, the scanner has been taken as an example of the device in the first embodiment of the information processing apparatus according to the present invention, but the similar effect is obtained with another image processing apparatus such as a printer or another device.

Other Embodiments

The present invention can also be implemented by processing of supplying a program configured to implement at least one function of the above-described embodiments to a system or an apparatus via a network or a storage medium and reading out and executing the program by at least one processor in the computer of the system or the apparatus. The present invention can also be implemented by a circuit (for example, ASIC) that implements at least one function.

For example, a flexible disk, hard disk, optical disk, magnetooptical disk, CD-ROM, CD-R, magnetic tape, non-volatile memory card, ROM, or DVD may be used as a storage medium for supplying a program code.

It is needless to say that the present invention includes not only a case in which the function of the above-described embodiment is implemented by the computer executing the read program code, but also a case in which the OS or the like running on the computer executes a part or all of the actual processing based on the instruction from the program code and the function of the above-described embodiment is implemented by the processing.

Further, it is needless to say that the present invention also includes a case in which the program code read out from the storage medium is written in a memory provided in a function expansion board inserted into the computer or a function expansion unit connected to the computer and a CPU or the like provided in the function expansion board or the function expansion unit executes a part or all of the actual processing based on the instruction from the program code, so that the function of the embodiment described above is implemented by the processing.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-068068, filed Mar. 29, 2019, which is hereby incorporated by reference herein in its entirety.

What is claimed is:

1. An information processing method of an information processing apparatus communicable with a plurality of devices, the method comprising:
    selecting any one of the plurality of devices as a device to be used to perform a predetermined process;
    detecting a device in communication with the information processing apparatus;
    installing, based on that the device to be used to perform a predetermined process is changed from a first device among the plurality of devices to a second device among the plurality of devices by the selecting, a second device driver corresponding to the second device to the information processing apparatus; and
    setting, to the second device driver installed by the installing, at least a part of setting data for performing the predetermined process set to a first device driver corresponding to the first device,
    wherein in the selecting, if the second device is detected in the detecting in a state in which the first device is selected, the second device is selected.

2. The method according to claim 1, wherein the information processing apparatus comprises a storage unit capable of storing the first device driver and the second device driver.

3. The method according to claim 1, wherein in the installing, in accordance with the case in which the selecting causes switching from the state in which the first device is selected to the state in which the second device is selected, the second device driver is downloaded from a web server, and the downloaded second device driver is installed in the information processing apparatus.

4. The method according to claim 1, further comprising deleting the first device driver from the information processing apparatus based on the case in which the selecting causes switching from the state in which the first device is selected to the state in which the second device is selected.

5. The method according to claim 1, wherein in the installing, the second device driver is installed based on a model of the second device being different from a model of the first device.

6. The method according to claim 1, further comprising prompting a user to check whether to use the second device if the second device is detected in the detecting in the state in which the first device is selected,
    wherein in the selecting, if the second device is detected in the detecting in the state in which the first device is selected and it is checked by the prompting that the second device is to be used, the second device is selected.

7. The method according to claim 1, wherein in the setting, when a state in which the first device is connected to the information processing apparatus and selected in the selecting and the second device is not connected to the information processing apparatus is switched to a state in which the second device is connected to the information processing apparatus and selected in the selecting and the first device is not connected to the information processing apparatus, at least a part of the setting data set to the first device driver is set to the second device driver.

8. The method according to claim 7, wherein
    a fixed IP address is assigned to the first device and the second device that are being connected to the information processing apparatus, and
    in the setting, if the fixed IP address assigned to the first device in a state in which the first device is selected in the selecting is same as the fixed IP address assigned to the second device when the state in which the first device is selected is switched to the state in which the second device is selected, at least a part of the setting data set to the first device driver is set to the second device driver.

9. The method according to claim 8, further comprising inquiring information of the fixed IP address assigned to one of the first device and the second device.

10. The method according to claim 1, wherein the setting data includes favorite settings that can be arbitrarily set by the user.

11. The method according to claim 1, wherein
    each of the first device and the second device is a scanner configured to read an original and generate image data, and
    the setting data includes at least one of a reading mode, an original type, a reading resolution, and image processing settings with respect to the read image data.

12. A non-transitory computer-readable storage medium storing a program for causing a computer of an information processing apparatus communicable with a plurality of devices to operate to:
    select any one of the plurality of devices as a device to be used to perform a predetermined process;
    detect a device in communication with the information processing apparatus;
    install, based on that the device to be used to perform a predetermined process is changed from a first device among the plurality of devices to a second device among the plurality of devices by the selecting, a second device driver corresponding to the second device to the information processing apparatus; and
    set, to the second device driver installed by the installing, at least a part of setting data for performing the predetermined process set to a first device driver corresponding to the first device,
    wherein in the operation to select, if the second device is detected in the operation to detect in a state in which the first device is selected, the second device is selected.

13. An information processing method of an information processing apparatus communicable with a plurality of devices, the method comprising:
- selecting any one of the plurality of devices as a device to be used to perform a predetermined process;
- installing to the information processing apparatus, based on that the device to be used to perform a predetermined process is changed from a first device among the plurality of devices to a second device among the plurality of devices by the selecting, a second device driver corresponding to the second device; and
- setting, to the second device driver installed by the installing, at least a part of setting data for performing the predetermined process set to a first device driver corresponding to the first device,
- wherein in the setting, when a state in which the first device is connected to the information processing apparatus and selected in the selecting and the second device is not connected to the information processing apparatus is switched to a state in which the second device is connected to the information processing apparatus and selected in the selecting and the first device is not connected to the information processing apparatus, at least a part of the setting data set to the first device driver is set to the second device driver.

* * * * *